Patented July 28, 1925.

1,547,201

UNITED STATES PATENT OFFICE.

WILLIAM S. CALCOTT, OF PENNSGROVE, NEW JERSEY, ASSIGNOR TO E. I. DU PONT DE NEMOURS & COMPANY, OF WILMINGTON, DELAWARE, A CORPORATION OF DELAWARE.

UTILIZATION OF CHLORACETIC ACID WASTE LIQUOR.

No Drawing. Application filed April 6, 1921, Serial No. 459,096. Renewed December 18, 1924.

*To all whom it may concern:*

Be it known that I, WILLIAM S. CALCOTT, a citizen of the United States, and a resident of Pennsgrove, in the county of Salem and State of New Jersey, have invented a certain new and useful Utilization of Chloracetic Acid Waste Liquor, of which the following is a specification.

This invention relates to a process of treating a mixture containing monochlor- and dichlor-acetic acids, such as the waste liquor for monochloracetic acid manufacture, to form a valuable product.

In the manufacture of chloracetic acid there is obtained a considerable quantity of a waste mother liquor consisting of a mixture of monochlor- and dichlor-acetic acids substantially free from water. I have discovered that by treatment with a metal such as iron this mixture of chlorinated acids can be reduced to acetic acid. The acetic acid combines with the iron used in the reduction, but can readily be liberated from this combination by treatment with a stronger mineral acid such as sulphuric acid; by distillation the free acetic acid can be obtained in a pure state satisfactory for use either in the manufacture of chloracetic acid or for other purposes.

A typical waste liquor from chloracetic acid manufacture has the following composition:

| | Parts. |
|---|---|
| Monochloracetic acid | 47.5 |
| Dichloracetic acid | 47.5 |
| Acetic acid | 5.0 | and also small amounts of impurities such as sulphur chloride, hydrochloric acid, and sulphuric acid.

My invention may be illustrated by the following example:—100 pounds of the waste liquor of the composition given above are mixed with eighty pounds of iron in the form of iron filings or crushed iron. The mass is then heated under a reflux condenser to 100° C. until the reaction is complete, which requires approximately two hours. Hydrochloric acid gas is evolved during the treatment. Eighty-five pounds of 66° Baumé sulphuric acid are then added, the mixture stirred, and the acetic acid distilled off and condensed. From 100 pounds of the waste liquor there should be obtained from 70 to 75 pounds of anhydrous acetic acid.

The process may be applied to any mixture of mono-chloracetic and dichloracetic acids, either with or without the presence of acetic acid. The exact temperature is of little importance except that too high a temperature causes excessive loss of acetic acid, while too low a temperature lengthens the time of reduction. Instead of iron, zinc, tin, or other metals soluble in acid with the evolution of hydrogen may be used.

Although I have described my invention in detail various changes may be made in the process as specifically disclosed without departing from the spirit and scope of the invention.

I claim:—

1. The process of producing glacial acetic acid which comprises bringing a mixture containing monochlor- and dischlor-acetic acids and being substantially free from water into contact with a metal which is soluble in acid with evolution of hydrogen.

2. The process of producing glacial acetic acid which comprises bringing a mixture containing monochlor- and dichlor-acetic acids and being substantially free from water into contact with a metal which is soluble in acid with evolution of hydrogen, adding to the resulting mixture an acid stronger than acetic acid, and removing the free acetic acid which is formed.

3. The process of producing glacial acetic acid which comprises bringing a mixture containing monochlor- and dichlor-acetic acids, and being substantially free from water into contact with a metal which is soluble in acid with evolution of hydrogen, adding concentrated sulphuric acid to the resulting mixture, and removing therefrom the free acetic acid which is formed.

4. The process of producing glacial acetic acid which comprises bringing comminuted metallic iron into contact with a mixture containing monochlor- and dichlor-acetic acids and being substantially free from water.

5. The process of producing glacial acetic acid which comprises bringing comminuted metallic iron into contact with a mixture containing monochlor- and dichlor-acetic acids and being substantially free from water, adding concentrated sulphuric acid to the resulting mixture, and removing therefrom the free acetic acid which is formed.

6. The process of producing glacial acetic acid which comprises bringing comminuted metallic iron into contact with a substantially anhydrous mixture containing monochlor- and dichlor-acetic acids mixed with a comparatively small proportion of acetic acid to reduce the chloracetic acids and form a mixture containing iron acetate, adding concentrated sulphuric acid thereto, and removing therefrom the acetic acid which is formed.

7. The process of producing glacial acetic acid which comprises bringing comminuted metallic iron into contact with a substantially anhydrous mixture containing about 47 parts of monochloracetic acid, about 47 parts of dichloracetic acid, and about 5 parts of acetic acid, adding concentrated sulphuric acid thereto to convert the iron acetate which is formed into iron sulphate and free acetic acid, and removing the latter.

8. The process which comprises mixing 80 parts of comminuted iron with a solution containing about 47 parts of monochloracetic acid, about 47 parts of dichloracetic acid, and about 5 parts of acetic acid, heating the mass under a reflux condenser until reduction of the chloracetic acids is complete, adding about 85 parts of 66° Baumé sulphuric acid, and distilling off the free acetic acid which has been formed.

9. The process of producing glacial acetic acid which comprises bringing a liquid containing a halogen-substituted acetic acid, and being substantially free from water, into contact with a metal which is soluble in acid with evolution of hydrogen.

10. The process of producing acetic acid which comprises bringing a liquid containing a chlorinated acetic acid, and being substantially free from water, into contact with a metal which is soluble in acid with evolution of hydrogen, adding concentrated sulphuric acid to the resulting mixture and removing therefrom the free acetic acid which is formed.

11. The process of producing glacial acetic acid which comprises bringing comminuted metallic iron into contact with a liquid mixture containing a chlor-acetic acid and being substantially free from water.

In testimony whereof I affix my signature.

WILLIAM S. CALCOTT.